Jan. 14, 1969     N. HAGEN     3,422,174
METHOD AND APPARATUS FOR PRODUCING HOLLOW PLASTIC ARTICLES
Filed Feb. 8, 1966     Sheet _1_ of 2
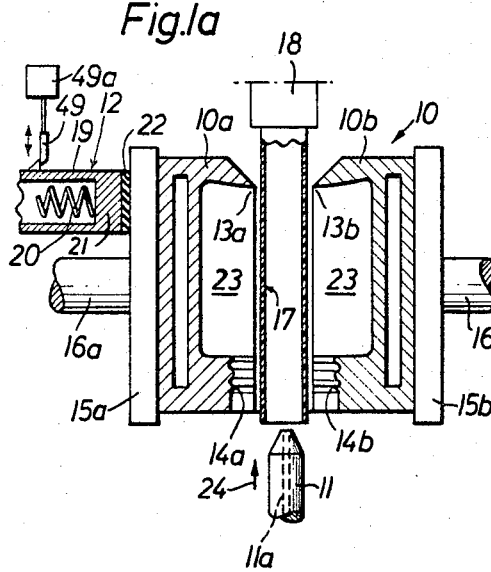
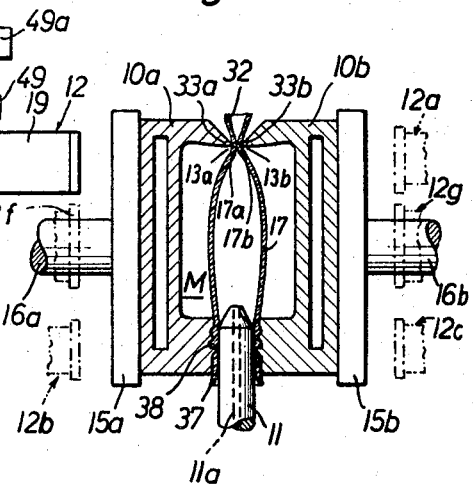
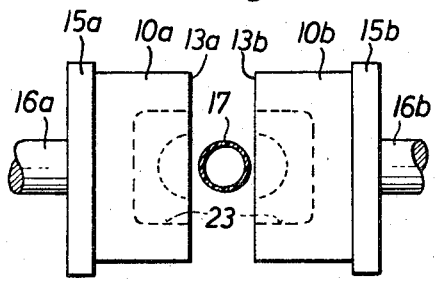
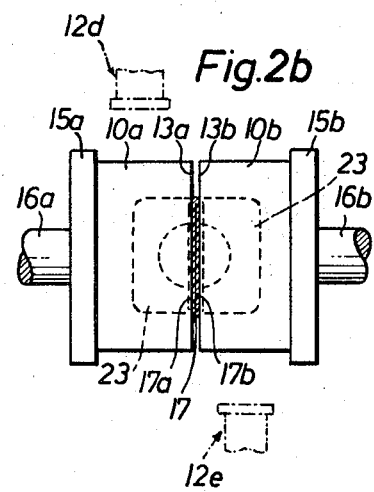
INVENTOR:
NORBERT HAGEN
BY
Michael J. Striker
his ATTORNEY

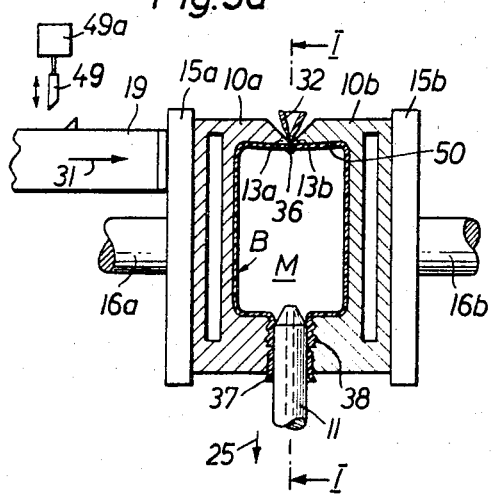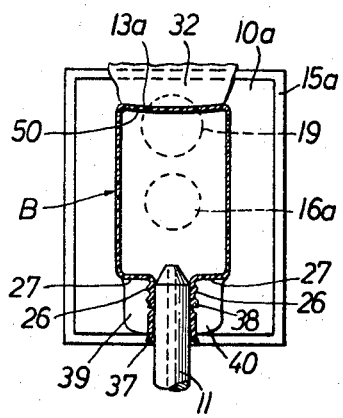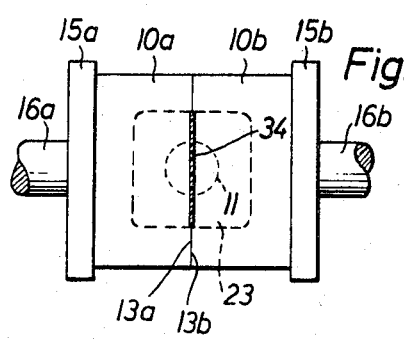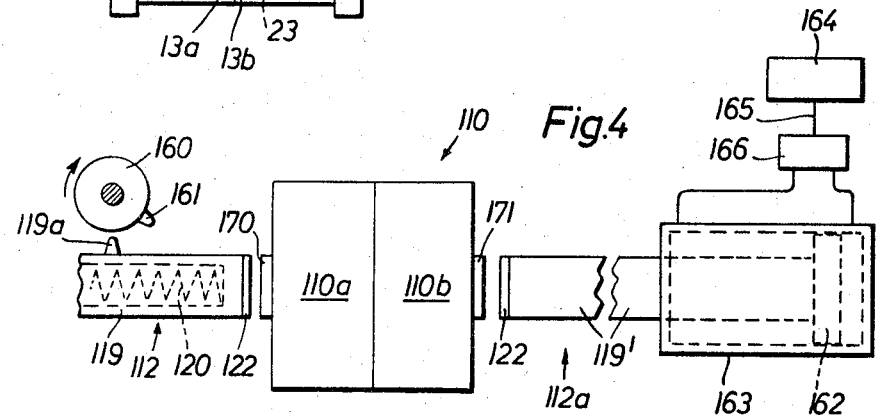

United States Patent Office 3,422,174
Patented Jan. 14, 1969

3,422,174
METHOD AND APPARATUS FOR PRODUCING HOLLOW PLASTIC ARTICLES
Norbert Hagen, Am Siegberg 3, Kuppenheim, Murgtal, Germany
Filed Feb. 8, 1966, Ser. No. 525,875
Claims priority, application Germany, Feb. 9, 1965, H 55,102
U.S. Cl. 264—69                                      31 Claims
Int. Cl. B29c 17/07; Q99c 17/12

ABSTRACT OF THE DISCLOSURE

A method of producing hollow plastic articles by blow molding in which a parison is introduced into a multi-section blow mold in such a manner that surplus material of the parison is located outside the mold cavity, and in which after closing the mold and pinching the surplus material between the mold sections at least one sudden hammer-like impact is imparted to the closed mold to thereby cause separation of the pinched surplus material from the remainder of the parison in the mold cavity; and an apparatus for carrying out the method.

---

The present invention relates to a method and apparatus for the production of plastic bottles and other hollow plastic articles. More particularly, the invention relates to improvements in a method and apparatus for the production of bottles or the like by blowing a gas into embryos or parisons consisting of deformable theremoplastic material while the parisons are received in the cavity of a multisection blow mold.

It is an important object of the present invention to provide a novel method of producing bottles and similar thermoplastic articles by blow molding according to which the transformation or conversion of a parison into a hollow plastic article can be carried out in such a way that all surplus material of the parison is either separated from the useful part of the parison or is partially separated to an extent which suffices to allow for convenient final separation subsequent to setting of plastic material in the blow mold.

Another object of the invention is to provide a method of the just outlined characteristics according to which complete or substantial separation of surplus material from that portion of a parison which is expanded in the cavity of a blow mold is accompanied by other beneficial effects upon the quality and appearance of the ultimate product.

A further object of the instant invention is to provide a method of the above outlined type according to which complete or substantial separation of surplus material from the useful portion of a tubular parison is accompanied by highly satisfactory welding of that portion of the parison which is to constitute the bottom wall of a plastic bottle or a similar hollow article of thermoplastic material.

An additional object of the invention is to provide a method which may be practiced by resorting to known multisection blow molds.

Still another object of the invention is to provide a method of the above outlined characteristics according to which all or some batches of surplus material may be separated (either in part or completely) from a hollow plastic article in a time-saving operation and by resorting to very simple, compact and long-lasting equipment.

A further object of the present invention is to provide a novel blow molding apparatus which may be utilized in practicing the above outlined method and to construct and assemble the apparatus of very simple, rugged and relatively inexpensive parts.

Another object of the invention is to provide a blow molding apparatus which can be readily adjusted to effect partial or complete separation of surplus material from plastic bottles and similar hollow plastic articles.

An additional object of the invention is to provide a novel blow molding apparatus wherein partial or complete separation of surplus material from hollow plastic articles can take place prior, subsequent to, or during blowing of a gas into an embryo and wherein such separation can be carried out in such a way that the ultimate product is of eye-pleasing appearance.

An ancillary object of the invention is to provide a blow molding apparatus with one or more assemblies which can promote or actually effect separation of surplus material from hollow plastic articles and which can also exert a beneficial influence on other functions of the apparatus.

Another object of the invention is to provide a method and apparatus for the production of blow molded hollow thermoplastic articles which can be utilized in blow molding of tough (hard-to-weld) or readily bondable plastic materials, which need not be provided with separate surplus-removing devices which must directly engage the surplus material, and which can effect satisfactory separation of surplus material despite the fact that the pressures required for actual closing of the mold are lower than in many presently known blow molding apparatus.

A further object of the invention is to provide a method and apparatus for blow molding hollow thermoplastic articles in such a way that, if desired, all or nearly all batches or appendages of surplus material may be removed prior to ejection of the finished article from the mold cavity.

Briefly stated, one feature of my present invention resides in the provision of a method of producing hollow plastic articles by the blowing process, particularly to a method of producing bottles consisting of synthetic thermoplastic material. The method comprises the steps of introducing a freshly extruded or otherwise produced tubular or sheet-like embryo or parison whose material is still in deformable state into an open multisection blow mold whose cavity is dimensioned in such a way that, upon closing of the mold, surplus material of the parison is located outside of the mold cavity, closing the mold so that the surplus material is pinched between more or less pronounced cooperating pinching edges of the mold sections whereby the pinching edges may effect at least partial welding of deformable material, and transmitting or imparting to the closed mold at least one blow or impact to thereby at least promote the separation of surplus material from the remainder of the parison in the mold cavity. The transmission of one or more impacts may precede the actual blowing operation and may be carried out prior to, during and/or subsequent to setting of the plastic material.

The impacts may be transmitted to one or more mold sections and may be imparted to the closed mold in different directions, for example, in opposite directions. Two or more impacts may be transmitted simultaneously or consecutively and such impacts may be transmitted to one or more substantially centrally located portions of the closed mold and/or to zones which are closely adjacent to surplus material. Also, the impacts may be transmitted to sections directly or indirectly and their direction may be such that they effect more pronounced closing of the mold or that they promote separation of surplus material by a shearing or squeezing action.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawings, in which:

FIG. 1a is a central vertical section through an apparatus which embodies one form of my invention, the blow mold being shown in open position and a tubular parison being shown in a position between the spaced-apart mold sections;

FIG. 1b is a top plan view of the structure shown in FIG. 1a with the extrusion nozzle omitted;

FIG. 2a is a central vertical section similar to the one shown in FIG. 1a but with the mold in closed position and with the extrusion nozzle omitted;

FIG. 2b is a top plan view of the structure shown in FIG. 2a;

FIG. 3a is a central vertical section similar to the one shown in FIG. 2a but illustrating the parison in expanded position subsequent to transmission of an impact to one of the mold sections;

FIG. 3b is a top plan view of the structure shown in FIG. 3a;

FIG. 1c is a section substantially as seen in the direction of arrows from the line I—I of FIG. 3a; and FIG. 4 is a somewhat schematic top plan view of a portion of a modified blow molding apparatus whose mold has been shown in fully closed position.

Referring to the drawings in detail, and first to FIGS. 1a and 1b, there is shown a blow molding apparatus which comprises a two-section blow mold 10, a vertically reciprocable blowing and calibrating mandrel 11, a feed including an extrusion nozzle 18 which forms part of a conventional extrusion apparatus, and an assembly 12 which serves to transmit to one of the mold sections 10a, 10b impacts in order to promote or to effect separation of surplus plastic material and to preferably assist in welding of material in a zone adjacent to surplus material.

The mold 10 comprises two mirror symmetrical sections 10a, 10b which are provided with cooperating pinching edges 13a, 13b and 14a, 14b. FIGS. 1a and 1b illustrate the mold sections 10a, 10b in open positions in which they allow for entry of a tubular embryo or parison 17 into the space therebetween. The two mold sections may be moved to closed positions (see FIGS. 2a and 2b) in which the mold 10 defines a mold cavity M having an outline corresponding to that of a finished plastic bottle B shown in FIGS. 3a and 1c. The displacing means for moving the sections 10a, 10b between closed and open positions comprises two clamping plates 15a, 15b which are secured to the exposed sides of the respective sections, and piston rods 16a, 16b which transmit motion to the respective clamping plates. The piston rods 16a, 16b may be reciprocated by hydraulic or pneumatic cylinder and piston units of known design which are not shown in the drawings. Reference may be had, for example, to U.S. Patent No. 2,975,473 to Hagen et al. The plates 15a, 15b may be integral with the mold sections 10a, 10b.

The assembly 12 is arranged to transmit impacts to the left-hand mold section 10a through the intermediary of the clamping plate 15a. In other words, the transmission of impacts takes place indirectly. The assembly 12 is shown as comprising a substantially sleeve-like ram 19 which consists of steel or other suitable metallic material and accommodates a resilient element in the form of a strong helical expansion spring 20. The foremost convolution of the spring 20 bears against the end wall or head 21 of the ram 19, and the exposed surface of this front end wall is preferably provided with a pad 22 of elastomeric material which acts not unlike a cushion and reduces noise as well as shocks when the spring 20 is allowed to dissipate its energy and to propel the ram 19 in a direction to the right, as viewed in FIG. 1a, so that the pad 22 strikes against the clamping plate 15a and the latter transmits the impact to the mold section 10a. The pad 22 may be attached to the plate 15a or each of the parts 19, 15a may be provided with an elastic cushion. The thickness of the pad 22 is such that the latter acts as a sound absorber but cannot prevent transmission of satisfactory impacts to the mold section 10a.

The apparatus which is illustrated in FIGS. 1a–3b is utilized for the production of bottles B of synthetic thermoplastic material. Therefore, the mold sections 10a, 10b are formed with mirror symmetrical recesses 23 which together constitute the mold cavity M when the mold 10 is closed by the piston rods 16a, 16b. In order to permit admission of a fresh embryo or parison 17, the mold sections 10a, 10b are first moved apart to assume the open positions shown in FIGS. 1a and 1b. Though the parison 17 is shown in the form of a tube, it can also take the form of a band, foil or sheet without departing from the spirit of my invention. The parison is extruded through the annular orifice of the extrusion nozzle 18 which is shown as being located directly above the space between the separated mold sections 10a, 10b so that the parison may enter between the recesses 23. The material of the parison 17 is still deformable at the time the piston rods 16a, 16b are caused to close the mold. Of course, it is equally possible to extrude the parison 17 at a point which is spaced from the mold 10 and to utilize a suitable transfer mechanism which can transport the freshly extruded and severed parison between the mold sections 10a, 10b. All that counts is that the apparatus should be equipped with a feed (either the extrusion nozzle 18 or a suitable transfer mechanism) which can supply parisons 17 between the mold sections 10a, 10b while the mold 10 is open.

FIG. 1a shows that the parison 17 (or the cavity M composed of the recesses 23) is dimensioned in such a way that surplus material of the parison extends upwardly beyond the pinching edges 13a, 13b and downwardly beyond the pinching edges 14a, 14b. This insures that the remainder of the parison between the pinching edges 13a, 13b and 14a, 14b invariably suffices to yield a satisfactory bottle B. Once the parison 17 is properly located with reference to the mold sections 10a, 10b, the piston rods 16a, 16b are caused to move toward each other and to close the mold 10 in a manner as shown in FIGS. 2a and 2b. Such movement of the mold sections 10a, 10b causes the cooperating pinching edges 13a, 13b and 14a, 14b to pinch the parison between that (main) portion which is accommodated in the mold cavity M and the surplus material which is respectively located above and below the pinching edges 13a, 13b and 14a, 14b. FIG. 2b shows clearly that the pinching edges 13a, 13b flatten the parison therebetween whereby the parison is at least partially welded along a seam which extends substantially diametrically of the bottom wall 50 of a finished bottle B. FIG. 2a shows that the pinching edges 13a, 13b move two portions 17a, 17b of the deformed parison 17 so close to each other that such portions meet between the pinching edges and, since the material of the parison is still in a deformable and weldable state, the portions 17a, 17b actually adhere to each other and, upon admission of compressed gas to the parison through the bore 11a of the mandrel 11, constitute the bottom wall 50 of the finished bottle. The surplus material 32 (see FIG. 3a) forms a so-called fin or flash which must be removed, either before or subsequent to removal of finished bottle B from the cavity M. As a rule, the surplus 32 is separated by the pinching edges 13a, 13b so that such pinching edges actually perform the function of cutters.

When the mold 10 is closed in a manner as shown in FIGS. 2a and 2b, the surplus material 32 need not be immediately separated from the portions 17a, 17b. In response to such closing, the pinching edges 13a, 13b may form in the external surface of the parison 17 two more or less pronounced grooves of channels 33a, 33b which are indicated in FIG. 2a and which promote the separation of surplus 32, either in response to more pronounced closing of the mold 10, in response to transmission of impacts by the assembly 12, and/or in response to mechanical or manual separation of such surplus from the finished article. In the illustrated embodiment, the separation of surplus material 32 takes place in response to the action of the assembly 12. The construction of the assembly 12 is preferably such that the plate 15a pushes the ram 19 back and causes the spring 20 to store energy when the mold section 10a is moved away from the mold section 10b. The ram 19 is then engaged by a suitable detent 49 or the like so that it need not follow the movement of the plate 15a from the position of FIG. 1a to that of FIG. 2a. By disengaging the dentent 49, the operator (or an automatic control device of the blow molding apparatus) can cause the spring 20 to dissipate its energy and to propel the pad 22 against the plate 15a when the latter assumes the position of FIG. 2a. Such movemnt of the ram 19 is indicated in FIG. 3a by an arrow 31. The clamping plate 15b and the piston rod 16b constitute a back support or anvil which prevents yielding of the mold section 10b so that, in response to an impact transmitted to the section 10a, the pinching edges 13a, 13b and 14a, 14b move nearer to each other and can actually separate surplus material from the remainder of the parison 17 in the mold cavity M. As shown in FIGS. 3a and 3b, the transmission of an impact to the mold section 10a need not necessarily result in complete separation of surplus material 32 above the pinching edges 13a, 13b. For example, the surplus material 32 may still remain connected with the bulk of the parison 17 by a very thin web 34 which is located between the pinching edges 13a, 13b. Once the material of the parison sets, the thin web 34 may be broken, preferably by hand or, if desired, by a suitable motor-driven stripper blade, in a manner well known from the art of blow molding apparatus. Reference may be had, for example, to the copending application Ser. No. 385,657 of Hagen which discloses a suitable stripping device.

FIG. 3a further shows a substantially diametrically extending seam 36 which connects the portions 17a, 17b of the parison 17 to each other and which is formed by the pinching edges 13a, 13b in response to closing of the mold 10 and in response to transmission of one or more impacts by the ram 19. It was found that the apparatus of my invention can form an exceptionally satisfactory seam 36 which is not pronounced so that it does not detract from the eye-pleasing appearance of the ultimate product but invariably prevents leakage through the bottom wall 50 of the bottle B.

When the blowing step is completed, the piston rods 16a, 16b are caused to move away from each other and to move the sections 10a, 10b to open positions. The clamping plate 15a then retracts the ram 19 and causes the spring 20 to store energy for the transmission of the next impact or impacts. The detent 49 then holds the ram 19 against forward movement with the plate 15a and is released only after the mold 10 again assumes the closed position shown in FIGS. 2a and 2b, namely subsequent to admission of a second parison 17 into the space between the recesses 23. In other words, the transmission of an impact takes place only after the pinching edges 13a, 13b have provided the parison with grooves 33a, 33b in response to pressure transmitted by the piston rods 16a, 16b. The formation of grooves 33a, 33b brings about at least partial welding of the portions 17a, 17b and such welding is completed when the pinching edges 13a, 13b are moved nearer to each other in response to expansion of the spring 20 and resultant impact against the clamping plate 15a.

The blowing mandrel 11 is movable up and down in a manner as disclosed, for example, in the Hagen application Ser. No. 385,657 or Hagen Patent No. 2,975,473. The upper end portion of this mandrel may be introduced between the lower portions of the mold sections 10a, 10b prior or subsequent to closing of the mold 10. The directions in which the mandrel 11 can move up and down are indicated in FIGS. 1a and 3a by arrows 24 and 25. When it moves upwardly to assume the position shown in FIG. 2a or 3a, the mandrel 11 cooperates with the lower pinching edges 14a, 14b to effect at least partial separation of an annulus of surplus material 37. The upper end portion of the mandrel 11 then extends into the lower end portion of the parison 17 and the surplus material 37 may remain connected with the neck 38 of the bottle B by a relatively thin annular web which can be readily broken away, preferably by hand or by a suitable stripping device. The same holds true for thin plate-like fins 39, 40 (see FIG. 1c) which are formed by surplus material penetrating between the adjoining faces of the mold sections 10a, 10b in the region of the neck 38. In the illustrated embodiment, the lower end portions of the mold sections 10a, 10b form the neck 38 of the finished bottle with external threads 26 so that the bottle can take an internally threaded cap. The fins 39, 40 of surplus material penetrate between the lower end portions of the mold sections and are flattened out not only in response to closing of the mold 10 by the piston rods 16a, 16b but particularly in response to the impact transmitted by the ram 19. The numerals 27 indicate in FIG. 1c the shoulder of the bottle B which extends radially outwardly from the neck 38 and merges into the trunk or main body portion of the ultimate product. If desired, the mold sections 10a, 10b may be provided with additional pinching edges (not specifically shown in the drawings) which may be located in the region of the neck 38 and shoulder 27 to effect substantial or full separation of fins 39 and 40.

It will be noted that, while the upper pinching edges 13a, 13b not only promote or actually effect separation of surplus material 32 but also effect welding of the portions 17a, 17b, the lower pinching edges 14a, 14b do not carry out any welding operation because the lower end portion or neck 38 of the bottle B should remain open. Nevertheless, the provision of the assembly 12 with ram 19 and spring 20 has been found to have a beneficial effect also upon the operation of lower pinching edges 14a, 14b because such pinching edges can be caused to effect complete or nearly complete separation of the surplus 37 and also because the top face of the neck 38 is finished with much greater precision than in heretofore known blow molding apparatus. In other words, the pinching edges 14a, 14b can be caused to form a very clean cut. The same holds true for the pinching edges which effect partial or complete separation of fins 39 and 40. The thinner the web 34 (and the corresponding web between the neck 38 and surplus material 37), the less readily detectable is the remainder of the web upon completed separation of surplus material from the finished article. As stated before, the impact transmitted by the ram 19 may be strong enough to effect immediate separation of all surplus material or immediate separation of one or more surplus parts. The beneficial effect of the assembly 12 is felt particularly where the pinching edges perform the dual function of separating (or promoting separation of) surplus material and welding the parison in the region adjacent to such surplus material. However, and as already explained hereinabove, the assembly 12 can also improve the action of such pinching edges or pinching portions which perform the sole function of promoting or effecting separation of surplus plastic material.

It is clear that the improved blow molding apparatus is susceptible of many modifications without departing from the spirit of my invention. For example, the apparatus may be used for the production of relatively large or relatively small bottles and other hollow plastic articles of any desired shape. The mold may comprise three or more sections. Also, the mold and the blowing mandrel may cooperate in a different way than that shown in the drawings; for example, the extrusion nozzle 18 may replace the mandrel 11 and is then provided with one or more bores which admit compressed gas into that portion of the parison which is surrounded by the mold sections 10a, 10b in closed position of the mold. Furthermore, the mandrel 11 may be introduced into the mold after the latter is closed; in such instances, the mandrel is preferably provided with a suitably enlarged annular portion or bead which will bear against the adjoining pinching edges of the mold sections. Moreover, the mold 10 may be mounted upside down so that the pinching edges 13a, 13b will engage the lower end portion of a freshly extruded parison. In such constructions, the nozzle 18 preferably also performs the function of the mandrel 11.

Referring again to FIG. 2a, there are shown three additional impact transmitting assemblies 12a, 12b, 12c which are indicated by phantom lines because they constitute an optional feature of the improved apparatus. The assembly 12a is located directly opposite the assembly 12 and can transmit impacts to the mold section 10b. The assemblies 12b, 12c are also located diametrically opposite each other and can respectively transmit impacts to the mold sections 10a, 10b in the region of the lower pinching edges 14a, 14b. FIG. 2b shows that the apparatus may comprise two additional impact transmitting assemblies 12d, 12e which respectively transmit impacts to the sections 10a, 10b in such directions that the surplus material is not so much pinched but rather sheared or squeezed off the remainder of a parison. In other words, the assemblies 12–12c are arranged to effect stronger closing of the mold 10 whereas the assemblies 12d–12e serve to effect displacements of mold sections 10a, 10b in parallelism with the plane in which the mold sections meet when the mold is fully closed.

Two further assemblies 12f, 12g (see FIG. 2a) are provided with annular rams which surround the piston rods 16a, 16b and can transmit to the sections 10a, 10b impacts in two substantially central portions of the mold 10. Thus, the improved apparatus may be provided with assemblies which transmit impacts close to the zones where the pinching edges promote or effect separation of surplus material and welding of the parison, and/or with assemblies which transmit impacts to one or more centrally located portions of the mold. At least one of the assemblies may comprise a suitable permanent magnet or electromagnet. For example, the armature of an electromagnet may constitute a ram and may be driven against the adjoining mold section in response to energization or deenergization of the electromagnet. Also, the ram or rams of one or more impact transmitting assemblies may be operated by high frequency or may constitute supersonic hammers or the like.

FIG. 4 illustrates the blow mold 110 of a modified apparatus which includes two impact transmitting assemblies 112, 112a. The assembly 112 comprises a ram 119 which is biased by a spring 120 in the same way as illustrated in FIG. 1a and which is provided with a follower or tooth 119a located in the path of the lobe 161 on a revolving cam 160. When the cam 160 rotates, its lobe 161 will retract the ram 119 against the bias of the spring 120 and then moves past the follower 119a to permit expansion of the spring 120. The assembly 112 is utilized in apparatus wherein a mold section should receive several impacts, either at regular intervals or at randomly distributed intervals (depending on the rotational speed of the cam 160).

The other assembly 112a comprises a ram 119' which constitutes the push rod of a piston 162 reciprocable in a pneumatic cylinder 163. The latter is connected with a source 164 of highly compressed gas by a conduit 165 which accommodates a suitable distributor valve 166. The valve 166 can admit into the cylinder 163 one or more blasts of compressed gas whereby the ram 119' is propelled against the mold section 110b. The operation of the assemblies 112, 112a may be synchronized in such a way that the rams 119, 119' transmit impacts simultaneously or consecutively, prior to, during or subsequent to complete setting of thermoplastic material of a parison which is located between the mold sections 110a, 110b. The mold sections 110a, 110b are provided with hardened wear-resistant projections 170, 171 which receive impacts from the rams 119, 119'. A similar projection may be provided on the clamping plate 15a of FIG. 1a to receive impacts from the ram 19. The displacing unit for moving the mold sections 110a, 110b toward and away from each other is not shown in FIG. 4. Each of the rams 119, 119' is preferably provided with a pad or cushion 122 of rubber or other suitable elastomeric material. The assembly 12a may comprise a hydraulic cylinder. The source 164 is then replaced by a pump.

A person not fully familiar with the art of blow molding could take the view that any surplus material which extends beyond the confines of the cavity defined by the sections of a blow mold could be separated in response to the application of a closing pressure which is strong enough to force the cooperating pinching edges of the mold sections into actual contact with each other or with the surface of a blowing mandrel. However, the characteristics of many thermoplastic materials which are utilized in blow molding of bottles or the like are such that a closing pressure which would result in complete separation of all surplus material would considerably exceed the maximum permissible pressure. Therefore, manufacturers of blow molding apparatus invariably select the closing pressure in such a way that surplus material continues to adhere to the finished article and is separated from the article by hand or by a suitable stripper. The closing pressure and the speed at which the sections of a blow mold are moved to closed positions are of particular importance in the production of hollow plastic articles (especially bottles) wherein the sections must actually seal one end of a parison, for example, to form the bottom wall of a bottle. The sealing operation is carried out by welding in that the material of a parison is pinched while it is still sufficiently deformable to form a strong fluidtight welded seam in response to transmission of stresses by the pinching edges of closed mold sections. In other words, one set of cooperating pinching edges (such as the pinching edges 13a, 13b of the apparatus shown in FIG. 1a) must perform two important functions including effecting at least partial separation of surplus material 32 and the formation of a satisfactory welded seam 36. The two functions are not necessarily compatible, i.e., rapid and complete separation of surplus material will not necessarily result in the formation of a satisfactory welded seam, or vice versa. Proper separation of surplus material will be effected by rapid and strong closing of the mold, whereas the quality of the seam normally improves if the mold is closed slowly so that a certain interval of time is permitted to elapse while the pressure between the parison portions 17a, 17b which are to be bonded to each other increases. Such gradual application of closing pressure is particularly desirable in forming welded seams on parisons which consist of low-pressure polyethylene, polypropylene and other relatively tough synthetic thermoplastic substances. In fact, it was found that it is actually undesirable to carry out the welding operation simultaneously with separation of surplus material when the parison consists of such hard-to-weld thermoplastic materials because the quality of the seam is unsatisfactory if the surplus is removed immediately in response to closing of the blow mold. It happens frequently that the pinching edges are incapable of forming a seam if the surplus material is pinched off while the mold sections move to closed positions. At the very best, the seam is very weak and, therefore, manufacturers dealing with polypropylene or polyethylene invariably suggest to clamp surplus material without effecting even partial separation of such surplus material. This enables the pinching edges to form a satisfactory seam. Actual separation of surplus material is carried out later.

Many experts in the field of blow molding propose to form the sections of a blow mold with blunt (less pronounced) pinching edges. In other words, the surfaces which are adjacent to the pinching edges are often inclined with reference to each other in such a way that the pinching edges can hold a substantial batch of material therebetween and that a relatively large quantity of material is urged to flow or advance toward the zone where the seam is being formed. Such configuration of surfaces on the pinching edges causes the formation of a more or less pronounced bead along the internal surface of the bottom wall in a blow-molded plastic bottle. The formation of such beads is considered to be of advantage because the beads extend along the welded seams and their material actually contributes to strengthening of the bond, particularly since the exposed surface of the bottom wall is preferably flat in order that the bottle can rest on a flat surface without the danger of overturning. Many blow molds are equipped with sections whose pinching edges are not edges at all but actually consist of rather dull portions having material engaging surfaces of a width in the range of between ½–3 mm. In blow molding of parisons which consist of polypropylene or the like, such dull pinching edges were found to be capable of forming reasonably strong welded seams.

Of course, a mold whose sections are formed with dull pinching edges is not likely to effect reasonably clean and smooth separation of surplus material because strongly pronounced and accurately defined separation of surplus material is enhanced by resorting to rather sharp pinching edges which act not unlike knives and actually sever the material of the parison. Therefore, an apparatus which utilizes a blow mold with sections whose pinching edges are dull must be equipped with additional devices which effect separation of surplus material. A dull pinching edge is not an edge at all but can be better defined as a welding bar which can effect satisfactory compression and bonding of plasticized material but is ineffective to bring about pronounced or complete separation of surplus material. The provision of knives and other types of stripping or surplus separating devices (in addition to dull pinching edges) contributes considerably to space requirements as well as to initial and maintenance cost of a blow molding apparatus.

My improved method and apparatus fully overcome the drawbacks of aforedescribed conventional methods and apparatus, regardless of whether a parison consists of readily weldable thermoplastic material or of a material which is not readily weldable simultaneously with rapid separation of surplus from the ends or from other zones of a parison in the mold cavity. This is due to the provision of one or more impact transmitting assemblies which enable the improved apparatus to subject the parison to a relatively low closing pressure such as is best suited to insure the formation of a satisfactory welded seam, and which also enable the apparatus to effect complete or substantial separation of surplus material before the finished article is removed from the mold cavity. Thus, the improved apparatus can yield plastic bottles and similar hollow plastic articles which are completely free of undesirable appendages despite the fact that the apparatus need not be equipped with knives, stripping blades and similar material-removing devices which must directly engage the surplus.

The impacts or blows to be imparted by one or more assemblies 12–12g of 112, 112a are transmitted by the respective rams subsequent to closing of the mold 10 or 110 so that the closing operation may be effected gradually and at a relatively low pressure if the material of the parison is such that a slowly progressing closing pressure will result in the formation of a superior welded seam. The transmission of one or more impacts may be timed in such a way that full or partial separation of surplus material takes place subsequent to the formation of a highly satisfactory seam. In other words, the separation of surplus material can follow the completion of a welded seam. This insures that the apparatus will produce a very satisfactory seam and that the surplus is separated with utmost accuracy because the mold sections may be formed with strongly pronounced pinching edges which can actually sever surplus material in a zone close to the external surface of the ultimate product. The formation of a satisfactory seam is due to the fact that the piston rods 16a, 16b can close the mold at a relatively low speed and that such piston rods can transmit a gradually increasing closing pressure which enables the material of the parison to form a strong bond. Once the pinching edges have formed a satisfactory seam, they become separators or knives in that they form a clean cut or a set of strongly pronounced grooves 33a, 33b to insure complete or nearly complete separation of the surplus with no traces of the web which has connected the surplus to the useful part of the ultimate product.

When the parison consists of a material which can form a satisfactory welded seam in response to rapid transmission of closing pressure, the impact transmitting assembly or assemblies may be operated simultaneously with closing of the mold so that the time required for completing a hollow plastic article is reduced. Also, in such instances, the impact transmitting means may impart to one or more mold sections blows which are strong enough to invariably and immediately result in complete separation of all surplus material. It was found that the improved apparatus will operate properly if the closing pressure is reduced well below the closing pressure which is necessary in conventional blow molding apparatus. In fact, the closing pressure may be reduced to 50 percent of blowing pressure which is necessary in apparatus of presently known design. Such reduction in closing pressure does not in any way affect the quality of the products while subjecting the mold to lesser wear and while simultaneously contributing to the formation of superior welded seams. The above outlined advantages of my apparatus are readily discernible if the apparatus is equipped with a single impact transmitting assembly and if the assembly is used to transmit a single impact to one of the mold sections. The impact need not be overly strong, i.e., its strength will depend on the condition of plastic material (whether the material has been allowed to set or its still in a readily deformable state), on the wall thickness of the parison, on the desired degree of separation, on the sharpness of pinching edges, on the direction in which the impact is transmitted to a mold section, and/or on a combination of such factors.

When the blow mold consists of two mirror symmetrical sections (such as the sections 10a, 10b of the mold 10 in FIG. 1a), the assembly or assemblies which transmit impacts are preferably arranged in such a way that the impacts promote closing of the mold, i.e., that the impact or impacts are transmitted in directions which are normal to the plane in which the faces of the mold sections abut against each other when the mold is closed. On the other hand, and as indicated by the mounting of the assemblies 12d, 12e of FIG. 2b, the transmission of impacts can take place in directions which are parallel with the aforementioned plane so that such impacts can effect shearing of surplus material. In some instances, impacts in directions at right angles to the separation plane of a two-section mold may be combined with impacts which are transmitted in parallelism with this plane. The assemblies 12d, 12e are particularly advantageous for separation of annular batches of surplus material, e.g., for separation of the annular surplus 37 shown in FIG. 1c. This will be readily understood since the pinching edges 14a, 14b of the mold sections 10a, 10b are of semicircular shape so that their separating action is enhanced if the sections 10a, 10b are subjected to impacts which are transmitted from several directions. On the other hand, and since the pinching edges 13a, 13b are straight, they can readily separate the surplus material 32 in response to impacts which are transmitted by the assemblies 12, 12a, i.e., in directions at right angles to the separation plane of the mold 10. However, it was found that, in most instances, arcuate pinching edges 14a, 14b can effect satisfactory separation of annular batches of surplus material in response to impacts which are transmitted by the assembly 12 and/or 12a so that the assemblies 12d, 12e are normally unnecessary.

The number of impacts and their directions will also depend from one or more of the aforementioned factors, for example, from the wall thickness of the parison, from the extent to which the hardening of plastic material has been allowed to proceed prior to transmission of impacts, from the composition of plastic material, and others. Similar considerations will guide the operator in deciding whether the impacts should be transmitted prior, subsequent to or prior and subsequent to hardening of plastic material. As a rule, the impact or impacts will be transmitted prior to complete setting of the plastic material.

The number of impact transmitting assemblies in a blow molding apparatus will depend on the magnitude of forces which they can transmit to the sections of a blow mold, on the dimensions of the mold, on the composition of plastic material, on the wall thickness of a parison, and/or on the positioning of such assemblies with reference to the mold. It is further clear that the impact transmitting assemblies may be constructed and mounted in such a way that their rams can strike directly against one or more mold sections, i.e., that the transmission of impacts takes place directly rather than indirectly as shown for the ram 19 of FIG. 1a. Direct transmission of impacts can be carried out by the assemblies 12d, 12e of FIG. 2b.

The exact moment when a ram will strike against the adjoining mold section may be controlled by a suitable timer (see the timer 49a of FIG. 1a which controls the detent 49) or by a programming unit which controls the operation of the apparatus. For example, and referring to FIG. 1a, the detent 49 which holds the ram 19 against movement with the piston rod 16a toward the position of FIG. 2a may be controlled by the timer 49a which can include an adjustable clockwork mechanism, or it may be released automatically in response to complete displacement of the piston rod 16a from the position of FIG. 1a to that of FIG. 2a. Also, and particularly when a blow molding apparatus is constructed in such a way that the mold moves away from registry with the extrusion nozzle 18 as soon as its mold sections are moved to closed positions, movement of the mold out of registry with the extrusion nozzle 18 may be utilized to effect release of the ram 19 and the transmission of an impact to the mold section 10a.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. A method of producing hollow plastic articles by the blowing process, comprising the steps of introducing a deformable parison into an open multi-section blow mold whose cavity is dimensioned in such a way that, upon closing of the mold, surplus material of the parison is located outside of the cavity; closing the mold so that the surplus material is pinched between the mold section; admitting a compressed gas to said parison; and transmitting to the closed mold at least one sudden impact to thereby at least promote the separation of the pinched surplus material from the remainder of the parison in the mold cavity.

2. A method as set forth in claim 1, wherein the sections of the mold are provided with pinching edges which engage the surplus material and simultaneously effect welding of the parison in the region of such surplus material in response to closing of the mold.

3. A method as set forth in claim 2, wherein said closing step subjects the parison to a pressure which suffices to effect said welding and wherein said impact transmitting step results in at least partial separation of surplus material.

4. A method as set forth in claim 1, wherein said impact transmitting step is completed prior to setting of the material of the parison.

5. A mehod as set forth in claim 1, wherein said impact transmitting step follows the setting of the material of said parison.

6. A method as set forth in claim 1, wherein said last named step comprises transmitting to the closed mold at least one impact prior and subsequent to setting of the material of said parison.

7. A method as set forth in claim 1, wherein said last named step comprises transmitting to the closed mold impacts from different directions.

8. A method as set forth in claim 7, wherein said impacts are transmitted to the mold from opposite directions.

9. A method as set forth in claim 7, wherein said impacts are transmitted simultaneously.

10. A method as set forth in claim 7, wherein said impacts are transmitted consecutively.

11. A method as set forth in claim 1, wherein said last named step comprises transmitting at least one impact to at least one substantially centrally located portion of the closed mold.

12. A method as set forth in claim 1, wherein said last named step comprises transmitting to the closed mold at least one impact in close proximity to said surplus material.

13. A method as set forth in claim 1, wherein said surplus material is pinched at a plurality of points and wherein said last named step comprises transmitting to the closed mold impacts in close proximity to at least some such points.

14. A method as set forth in claim 1, wherein said last named step comprises indirectly transmitting impacts to at least one mold section.

15. In an apparatus for producing hollow plastic articles by the blow molding process, a mold including a plurality of sections movable from open to closed positions in which latter the mold defines a mold cavity; displacing means for moving said sections between such positions; a feed for introducing between said sections, in open positions thereof, deformable parisons of such dimensions that at least some surplus material is pinched between said sections in response to movement of said sections to closed positions; and an assembly for transmitting to said mold sudden impacts in closed positions of said sections to effect at least partial separation of the pinched surplus material.

16. A structure as set forth in claim 15, wherein said sections are provided with cooperating pinching portions which are pressed between the surplus material and the remainder of a parison in said mold cavity in response to movement of said sections to closed positions and during transmission of impacts.

17. A structure as set forth in claim 15, wherein said assembly comprises means for transmitting to at least one of said sections impacts in directions to promote separation of surplus material by a shearing action.

18. A structure as set forth in claim 15, wherein said assembly comprises at least one ram which is reciprocable against and away from at least one of said sections in closed position thereof.

19. A structure as set forth in claim 18, wherein said ram consists at least in part of metallic material.

20. A structure as set forth in claim 18, wherein said assembly further comprises resisilent means for biasing said ram in a direction to propel the ram against said one section.

21. A structure as set forth in claim 20, wherein said ram is positioned to deform said resilient element in response to movement of said one section to open position whereby said resilient element stores energy.

22. A structure as set forth in claim 15, further comprising timer means for controlling the timing of impacts which are transmitted by said assembly.

23. A structure as set forth in claim 15, wherein said assembly comprises a ram and fluid-operated means for propelling said ram against said mold.

24. A structure as set forth in claim 15, wherein said assembly comprises aram and magnetic means for propelling the ram against said mold.

25. A structure as set forth in claim 15, wherein said assembly comprises a high-frequency operated device.

26. A structure as set forth in claim 15, wherein said assembly comprises an ultrasonic hammer.

27. A structure as set forth in claim 15, wherein at least one of said mold sections comprises a projection and said assembly comprises a ram which is reciprocable against and away from said projection.

28. A structure as set forth in claim 27, wherein said one mold section comprises a clamping plate and said projection is provided on said plate.

29. A structure as set forth in claim 15, wherein said assembly comprises a ram having a head provided with a cushion of elastomeric material and means for propelling said ram against the mold whereby said cushion strikes against at least one of said sections.

30. A structure as set forth in claim 15, wherein one of said mold sections comprises a cushion of elastomeric material, said assembly comprising a ram and means for propelling said ram against said cushion.

31. A structure as set forth in claim 15, wherein said assembly comprises means for transmitting to opposite mold sections in the closed position of the mold sudden impacts directed toward each other.

References Cited

UNITED STATES PATENTS

| | | | |
|---|---|---|---|
| 2,541,249 | 2/1951 | Hobson | 264—98 X |
| 2,991,500 | 7/1961 | Hagen | 264—98 X |
| 3,004,285 | 10/1961 | Hagen | 264—98 |
| 3,048,891 | 8/1962 | Maass | 264—98 |
| 3,174,181 | 3/1965 | Langecher | 18—2 |
| 3,224,916 | 12/1965 | Soloff et al. | 264—23 X |
| 3,309,442 | 3/1967 | Stanley | 264—98 |
| 3,348,267 | 10/1967 | Novel. | |

ROBERT F. WHITE, *Primary Examiner.*

A. R. NOE, *Assistant Examiner.*

U.S. Cl. X.R.

18—5, 35; 264—98, 161